No. 757,352.

Patented April 12, 1904.

UNITED STATES PATENT OFFICE.

JULES MARIE SANGUINETI, OF LILLE, FRANCE.

MANUFACTURE OF WHISKY, GIN, OR OTHER SPIRITS.

SPECIFICATION forming part of Letters Patent No. 757,352, dated April 12, 1904.

Application filed December 22, 1902. Serial No. 136,258. (No specimens.)

*To all whom it may concern:*

Be it known that I, JULES MARIE SANGUINETI, chemist, a citizen of the French Republic, residing at Lille, Department of Nord, France, (and having post-office address 13 Place Simon Vollant, in said city,) have invented certain new and useful Improvements in Manufacture of Whisky, Gin, or other Spirits, of which the following is a specification.

This invention relates to certain new and useful improvements in a method of manufacturing distilled spirits made from grain-wort.

In the methods generally used the fermentation of the wort is obtained by adding thereto ordinary brewer's yeast, which possesses no fixed characteristics, so that the fermentation of the wort gives very irregular results.

The peculiar flavors of distilled spirits, such as whisky, result not only from the mixtures of different kinds of grain which are used in their manufacture, but also from the elements given thereto by the yeast, and as this yeast is never of the same fixed character it is open to the objection that it causes various kinds of extraneous micro-organisms or other ferments to multiply in the wort, so that it is impossible to manufacture spirits having the same flavor regularly. The method hereinafter set forth aims to overcome such objection; and it consists in the preparation of and use of special ferments of fixed characteristics, so that the spirits will always have the same flavor.

The method further possesses the advantages as hereinafter set forth.

According to the method hereinafter set forth, for the manufacture of each kind of spirit a special yeast is used which corresponds to the wort employed or possesses the same characteristics as the wort employed for manufacturing the spirit.

The special yeast or ferments are obtained by the following cultivation, and it would be well to state that instead of the ordinary brewer's yeast the yeast or ferment which is used after having been selected by the ordinary bacteriological methods is cultivated in a wort which is of the same special composition as the wort to be fermented. For instance, if Irish whisky is to be made the wort will consist of a mixture of malt, oats, rye, barley, and wheat; if it is Scotch whisky, the wort will consist of malt only. In short, the wort used for the cultivation of the yeast will always be of the same composition as used for the manufacture of each different kind of grain spirits—Scotch, Irish, Bourbon, or rye whisky or gin. The yeast being selected is then cultivated and preserved for use. From the yeast are separated the ferments other than the ethylic in any known manner, thus preventing the production of foreshots, acids, and oily impurities. The pure ferments are then introduced in a wort of a similar composition to that which has produced the ferments and a composition also similar to that which forms the wort to be fermented. In a suitable medium the yeast begins its evolution, but is prevented from completing its evolution before the cells grow aged, and the degeneracy begins by mixing with the wort on the second day of evolution of the yeast a certain quantity of spirit which is furnished from a wash coming from a wort having the same composition. This quantity of spirit is fixed according to the kind of whisky chosen and used in each distillery and to its physiological properties. It may be stated to be between six and ten per cent. of the volume of the wort. For example, for a whisky of a special quality it is sufficient to introduce the selected yeast into a wort having the composition as that used for the manufacture of that specified kind of whisky. This adding to the spirit benumbs the ferments, thereby preventing any further increase thereof, and the ferments are thus preserved and kept ready for use in their benumbed state until required for sowing and starting the fermentation in the wash-backs. These ferments brought into action in a wort having the same composition as that used for their production and their first increasing have acquired new and special properties. Their increasing has become remarkably regular and extremely rapid, and having been produced and multiplied in a wort having the same composition as the wort they are used for fermenting their activity when placed in this wort to which they have been adapted beforehand becomes extreme. This is proved by the fact that one pint of yeast is sufficient to ferment from twenty-five to thirty thousand gallons of wort. I do not insist on their regular and rapid increasing, but that what is the most characteristic is that being produced in a wort having the same composition as the wort to be fermented these ferments are, when used, in a medium in which their action increases in particular proportions.

The manufacture of the spirits by the ferments hereinbefore set forth is as follows: The mixture of grain (malt, barley, wheat, oats, rye, maize) is made in proper proportions, varying with the quality and flavor required in the whisky. This mixture is boiled at a temperature slightly exceeding the boiling-point of water in a converter provided with mechanical means for continuously mixing the wort. The malt after being finely ground is added when the wort has been cooled down to the proper temperature for saccharification, (140° to 150° Fahrenheit.) The wort is then heated up to boiling in order to destroy the micro-organisms brought in by the malt and conveyed into a tank provided with a mechanical mixing apparatus and built on the principle of the Hansen yeast-tank used for making pure yeast for breweries. When the wort has cooled down to about 90° Fahrenheit, the fermentation is started by sowing a given quantity of the special ferment hereinbefore set forth. One pint of yeast is sufficient to start the fermentation in a tank containing from twenty-five thousand to thirty thousand gallons of wort. The wort is aerated by forcing through it air rendered absolutely free from any micro-organisms, and the fermentation is then allowed to proceed, the wort being kept in motion by any kind of a mechanical agitator. Four days at the most after the sowing of the yeast the fermentation is completed, and there is no more fermentable matter in the wash. The whole of the fermentable matter is turned into spirits. The wash is subsequently distilled in the same pot-stills that are now used in the whisky and gin distilleries. The only difference is that instead of having to redistil several times in order to collect the fine spirits and get rid of the oily impurities it is only necessary to distil twice at most, for hardly any foreshots, acids, or fusel-oil are produced, because the special ferment is pure. This is one of the main advantages of the process, as it prevents the loss of spirits caused by redistilling several times and as it is possible to largely increase the production with the same number of apparatus.

By this process, in which a little quantity of ferments is sufficient to act on a great volume of wort, a notable economy of ferments is realized, and these ferments are not bought brewer's yeast, but a product obtained in the laboratory without any expense. The ferments which are not ethylic ferments being completely eliminated, the production of acid and oily impurities and foreshots is prevented, and for that reason the number of distillations may be diminished.

The use of the special ferments suited by their manufacture to the composition of the kind of wort on which they act has for its result to strengthen the flavor peculiar to the corresponding kind of spirit. The fermentation being pure and working in a closed tank may take place without trouble at a relatively high temperature, (about 90° Fahrenheit.) It is possible to work in any season, even during the summer months. The wort being sterilized before the fermentation, the fermentation may be extended as far as required, and the whole of the fermentable matter contained in the wort may be utilized. The fermentation being pure and taking place in closed tanks, it is easy to collect the chemically-pure carbonic acid from the fermentation to compress or liquefy it and sell it at a large profit.

In the manufactures having open tanks for the fermeniation of the worts the fermentation may be only begun in closed tanks with the special ferments and continued in open tanks simply provided with a cover.

Having thus fully described my invention, what I claim as new, and desire to secure by Letters Patent, is—

1. In the process of manufacturing distilled spirits the process which consists in selecting a yeast from a wash coming from a wort of the same composition as the wort for producing the spirit, eliminating the impure ferment from the yeast, then cultivating the yeast in a wort having the same composition as the wort giving the wash the yeast was selected from, then preventing the increase of the yeast by the addition thereto of a quantity of spirit from a wash having the same composition as the wash the yeast was selected from and cultivated in, then sterilizing a wort of the same composition as the wort giving the wash from which the yeast was selected, and then incorporating the cultivated yeast in said sterilized wort.

2. In a process of manufacturing distilled spirits, the process which consists in selecting a yeast from a wash coming from a wort of the same composition as the wort for producing the spirit, eliminating the impure ferment from the yeast, then cultivating the yeast in a wort having the same composition as the wort giving the wash the yeast was selected from, and then preventing the increase of the yeast by the addition thereto of a quantity of spirit from a wash having the same composition as the wash the yeast was selected from and cultivated in.

In testimony whereof I have hereunto set my hand in presence of two subscribing witnesses.

JULES MARIE SANGUINETI.

Witnesses:
  PERCY READ GOLDRING,
  MARCELIN LECOPPE,